(Model.)

W. J. PLUMMER & P. TURPIN.
WHEEL TIRE.

No. 267,249. Patented Nov. 7, 1882.

WITNESSES:
Francis McArdle
C. Sedgwick

INVENTOR:
W. J. Plummer
P. Turpin
BY Munn & Co.
ATTORNEYS.

UNITED STATES PATENT OFFICE.

WILLIAM J. PLUMMER AND PETERFIELD TURPIN, OF OLYMPIA, WASHINGTON TERRITORY.

WHEEL-TIRE.

SPECIFICATION forming part of Letters Patent No. 267,249, dated November 7, 1882.

Application filed June 24, 1882. (Model.)

*To all whom it may concern:*

Be it known that we, WILLIAM JONES PLUMMER and PETERFIELD TURPIN, of Olympia, in the county of Thurston and Territory of Washington, have invented a new and useful Improvement in Wheel-Tires, of which the following is a full, clear, and exact description.

Our invention relates to adjustable wheel-tires; and it consists in the peculiar construction and arrangements of parts, as hereinafter fully described, and pointed out in the claim.

Reference is to be had to the accompanying drawings, forming part of this specification, in which similar letters of reference indicate corresponding parts in all the figures.

Figure 1:
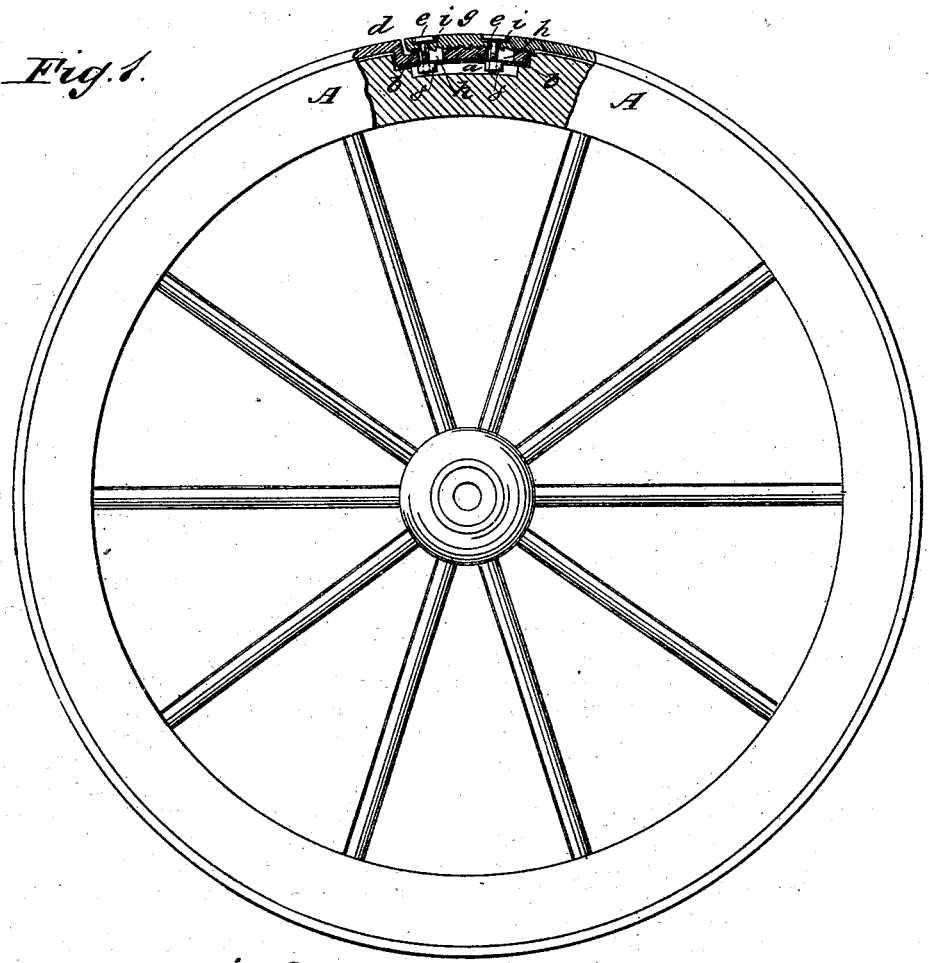
Figure 2:
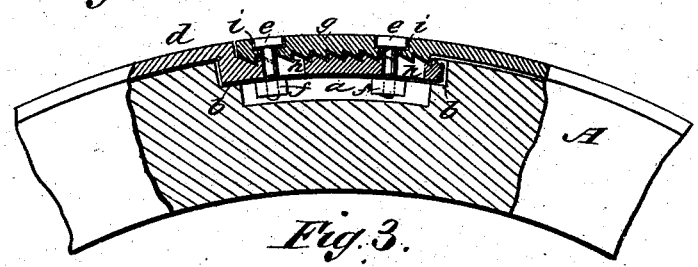
Figure 3:
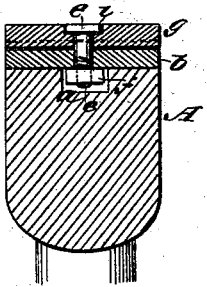

Figure 1 is a side elevation of a wagon-wheel, with a part of the tire and rim in section, showing our improvement. Fig. 2 is a section of the joint in the same view as Fig. 1, but on a larger scale; and Fig. 3 is a transverse section of the tire and wheel-rim through the joint of the tire.

A represents the wheel-rim, which, for the purposes of our invention, has a stepped recess, $a$, in the face, in which the offset portion $b$ of the end $d$ of the tire and the bolts $e$ and nuts $f$ may have space. The outer face of the offset $b$ of the tire is serrated, and the inner face of a portion, $g$, of the other end of the tire is also serrated, so that when bolted together the parts cannot slip. The offset part $b$ has slotted holes $h$ for the bolts $e$, to enable them to be shifted along the joint for tightening the tire, and the part $g$ has round holes with square sockets $i$ for holding the heads of the bolts when screwing up the nuts.

To apply the tire to the wheel it is first adjusted to the size of the wheel when tightened thereon, and bolted together. Then it is to be heated and shrunk on, in the same manner as other tires are. Afterward, when the wheel shrinks, the tire can be shortened and reapplied, as before, without the aid of a blacksmith.

We are aware that the ends of a tire have been heretofore serrated and bolted together, the wood felly being provided with a gap at that point and an iron felly inserted therein and bolted to the ends of the wooden felly, and we therefore do not claim such invention. In our invention we dispense with the iron felly and the making of a gap in the wooden felly, whereby the wheel is weakened and disfigured, and produce in lieu thereof a cheaper, stronger, and better wheel.

We are also aware that it is not broadly new to recess the felly of a wheel, and therefore do not claim it *per se*.

Having thus fully described our invention, what we claim as new, and desire to secure by Letters Patent, is—

The combination, with the felly A, provided with the stepped recess $a$, of a tire having the end $d$, provided with a serrated offset, $b$, and slots $h$, and the end $g$, having its inner face serrated and provided with bolt-holes and sockets $i$, and the bolts $ef$ for clamping the said ends together, substantially as and for the purpose set forth.

WILLIAM J. PLUMMER.
PETERFIELD TURPIN.

Witnesses:
P. P. CARROLL,
S. G. TALCOTT.